UNITED STATES PATENT OFFICE.

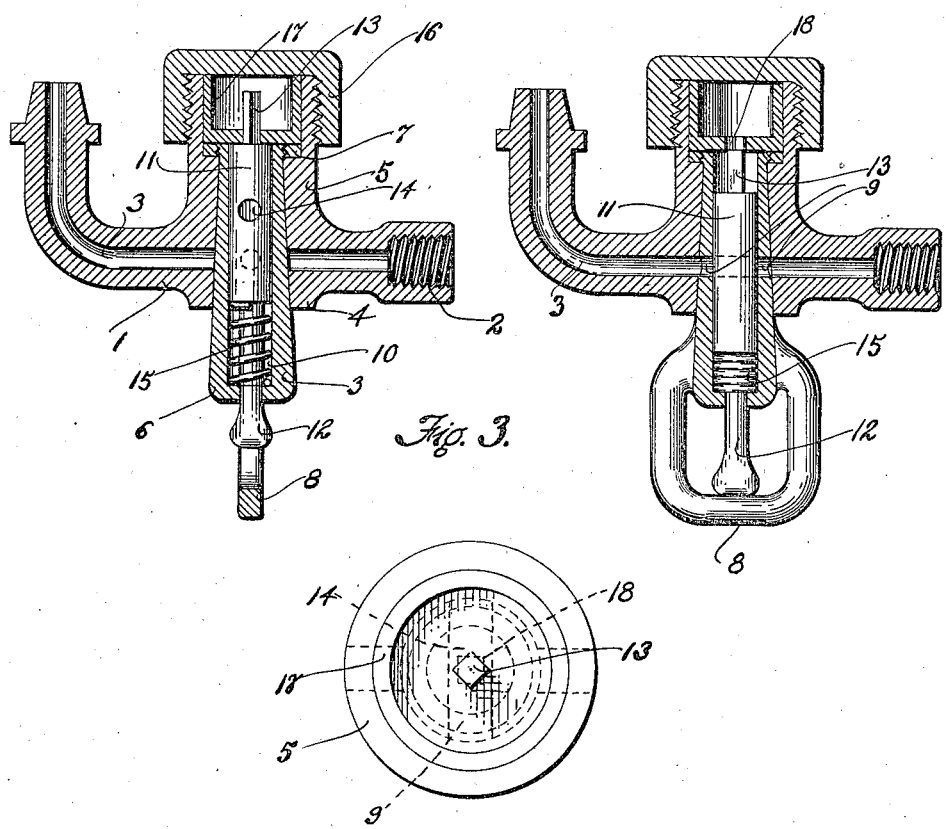

EDWARD J. GORDON, OF HOLYOKE, MASSACHUSETTS.

SAFETY GAS-COCK.

1,181,305.  Specification of Letters Patent.  Patented May 2, 1916.

Application filed August 11, 1915. Serial No. 44,975.

*To all whom it may concern:*

Be it known that I, EDWARD J. GORDON, a citizen of the United States, residing at Holyoke, in the county of Hampden and State of Massachusetts, have invented certain new and useful Improvements in Safety Gas-Cocks, of which the following is a specification.

This invention relates to a safety gas cock of the turn plug type.

One of the objects of the invention is to provide a safety gas cock element, besides providing the usual turning plug element for opening the gas passage, said safety plug being displaceable relative to the first mentioned plug and which acts to establish or interrupt the flow of gas dependent upon the relative position of the said safety plug with respect to the usual turning plug.

Another object resides in the provision of means for normally maintaining the safety plug in that position wherein the flow of gas would be interrupted even though the usual turning plug were left in the open position. And still another object consists in providing means for holding the safety plug in that position in which the flow of gas is permitted when desired.

With the above and other objects in view I will now proceed to describe the details of my invention as illustrated in the accompanying drawings, wherein I have shown one specific embodiment of the invention for the purpose of illustration only.

In the drawings: Figure 1 is a central sectional view through a safety gas cock constructed according to my invention, and showing the usual turning plug and the safety plug in the off position. Fig. 2 is a similar sectional view, but showing the two plugs in the on position, which position permits a flow of gas through the gas cock, and Fig. 3 is a plan view with the cap which fits over the gas cock removed.

In detail:—The safety cock as shown comprises the casing 1 having the threaded connection 2 leading to a fluid passage 3 extending through the casing 1. The said casing 1 is provided upon one side with a boss 4 and on the other with an extension 5 and through these members and transversely positioned relative to the fluid passage 3 is an opening adapted to receive the turning plug 6 which is mounted for rotation therein and is held in place by the flange 7 threaded to the said turning plug 6. The turning plug 6 carries the handle or thumb piece 8 for turning it to the off and on positions. Also the said turning plug 6 is hollow and is provided with alining openings 9 which, when the turning plug is rotated to the position shown in Fig. 2 aline with the gas passage 3.

Disposed within the chamber 10 of the turning plug 6 is a safety plug 11 carrying an extension 12 which projects within the thumb piece 8 of the turning plug 6, and also is provided with a squared extension 13 on the opposite end thereof. The safety plug 11 is provided with a passage 14, and since the said safety plug is displaceable rotatably of the turning plug 6, and also longitudinally thereof, this opening 14 is positioned so that it may be brought into two positions, namely that position wherein it alines with the passage 3 and openings 9 and thereby establishes the through passage in the gas cock or in that position where it interrupts the passage and cuts off a flow of gas through the cock.

In order to prevent the possibility of leaving the gas turned on, through carelessness or otherwise, the spring 15 is located within the chamber 10 and acts to normally maintain the said safety plug 11 in that position wherein the flow of gas is cut off, even though the turning plug 6 should be left in the usual on position.

To provide for retaining the safety plug in that position shown in Fig. 2 when desired, and wherein the gas is permitted to flow through the gas cock, a cap 16 is screwed onto the extension 5 and holds in place a member 17 provided with a squared aperture 18 alining with the squared extension 13. Thus if the safety plug 11 be drawn down to the position shown in Fig. 2 and turned to aline with the openings 9 and passage 3 it will be retained in such position by reason of the fact that the end of the extension 13 and the aperture 18 do not correspond and are held in abutting relation.

The operation is as follows: Suppose it is desired to move the said plugs from that position shown in Fig. 1 to that position shown in Fig. 2, first the plug 6 is turned so that the member 8 is at right angles to the position shown in Fig. 6 or in alinement with the passage 3 of the casing. The member 12 of the plug 11 is then grasped and drawn downwardly and rotated to the position shown in Fig. 2, in which position it will be retained by the said squared extension 13, and thus a flow of gas through the gas cock will be established.

When it is desired to turn off the gas the plugs 6 and 11 are moved to the position shown in Fig. 1 in which the spring 15 acts to displace the said safety plug 11 in an upward direction thereby cutting off the flow of gas.

From the foregoing specification, it will be evident that I have provided a safety gas cock of novel construction, but it is to be understood that I do not limit myself to the specific construction and arrangement of parts here set forth and illustrated excepting in so far as the appended claim imports.

I claim:—

A safety gas cock, comprising in combination, a casing having a fluid passage, a valve plug mounted in said casing and having an opening adapted to be brought into alinement with said fluid passage, a safety plug within said opening and having a passage therethrough, said safety plug being movable longitudinally into a position to establish a flow through said fluid passage or interrupt such a flow, spring means normally maintaining said plugs in the last named position, a squared extension on said safety plug and a head provided with a square opening to receive said extension when said safety plug is in the last named position and to engage and hold said safety plug when moved to the first named position.

In testimony whereof I affix my signature in presence of two witnesses.

EDWARD J. GORDON.

Witnesses:
J. HORACE GELINEAU,
ALBERT A. GORDON.

Copies of this patent may be obtained for five cents each, by addressing the "Commissioner of Patents, Washington, D. C."